Feb. 28, 1956    F. CARTLIDGE    2,736,545
MINING MACHINE ROTATING CUTTER HEAD WITH GEAR TRAIN DRIVE
Filed Dec. 11, 1952    4 Sheets-Sheet 3
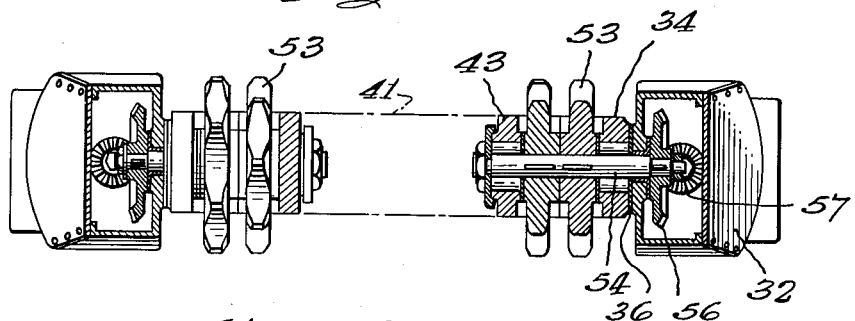
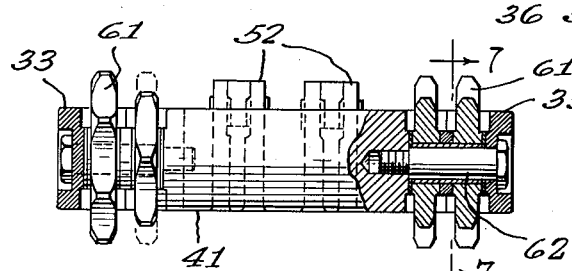
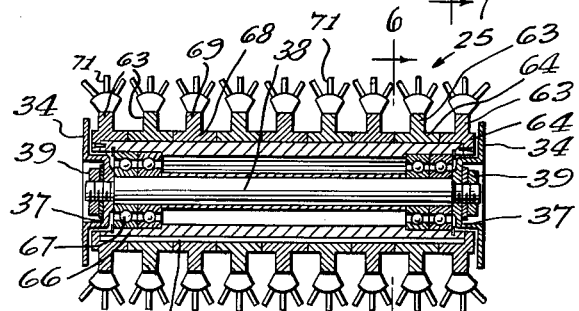
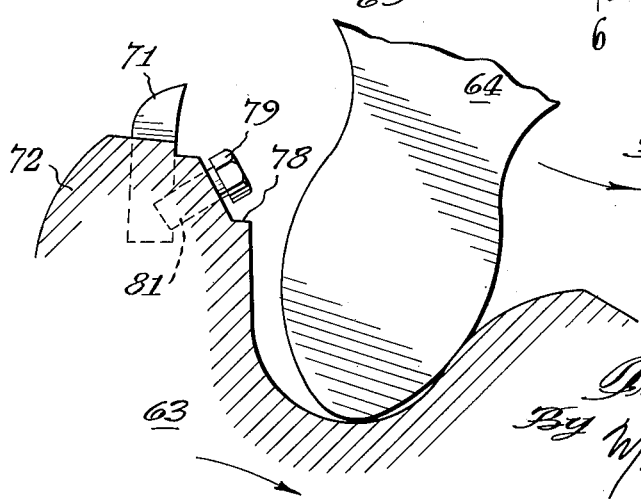
Inventor
Frank Cartlidge
By Murray A. Gleeson
Attorney Feb. 28, 1956  F. CARTLIDGE  2,736,545
MINING MACHINE ROTATING CUTTER HEAD WITH GEAR TRAIN DRIVE
Filed Dec. 11, 1952  4 Sheets-Sheet 4

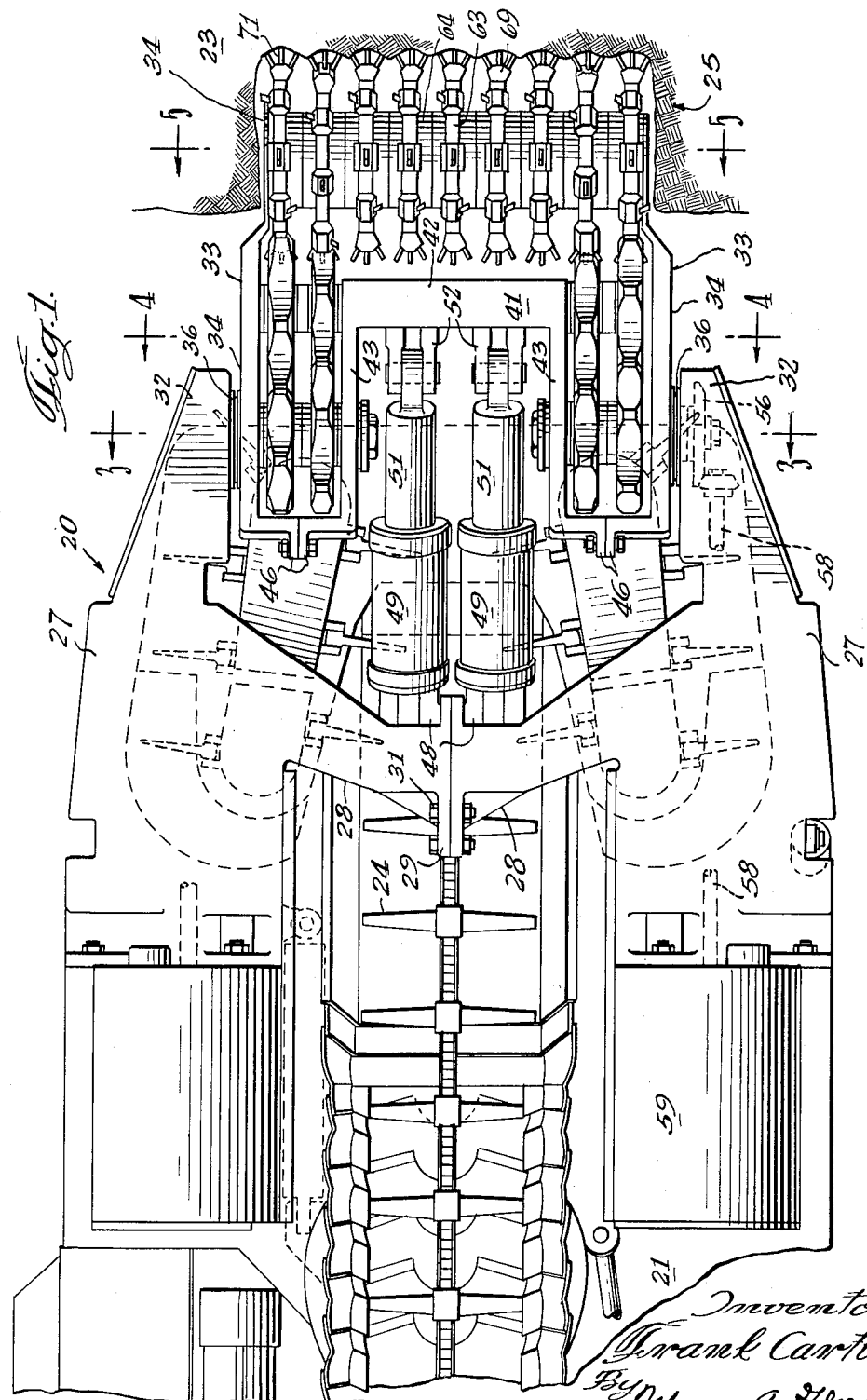

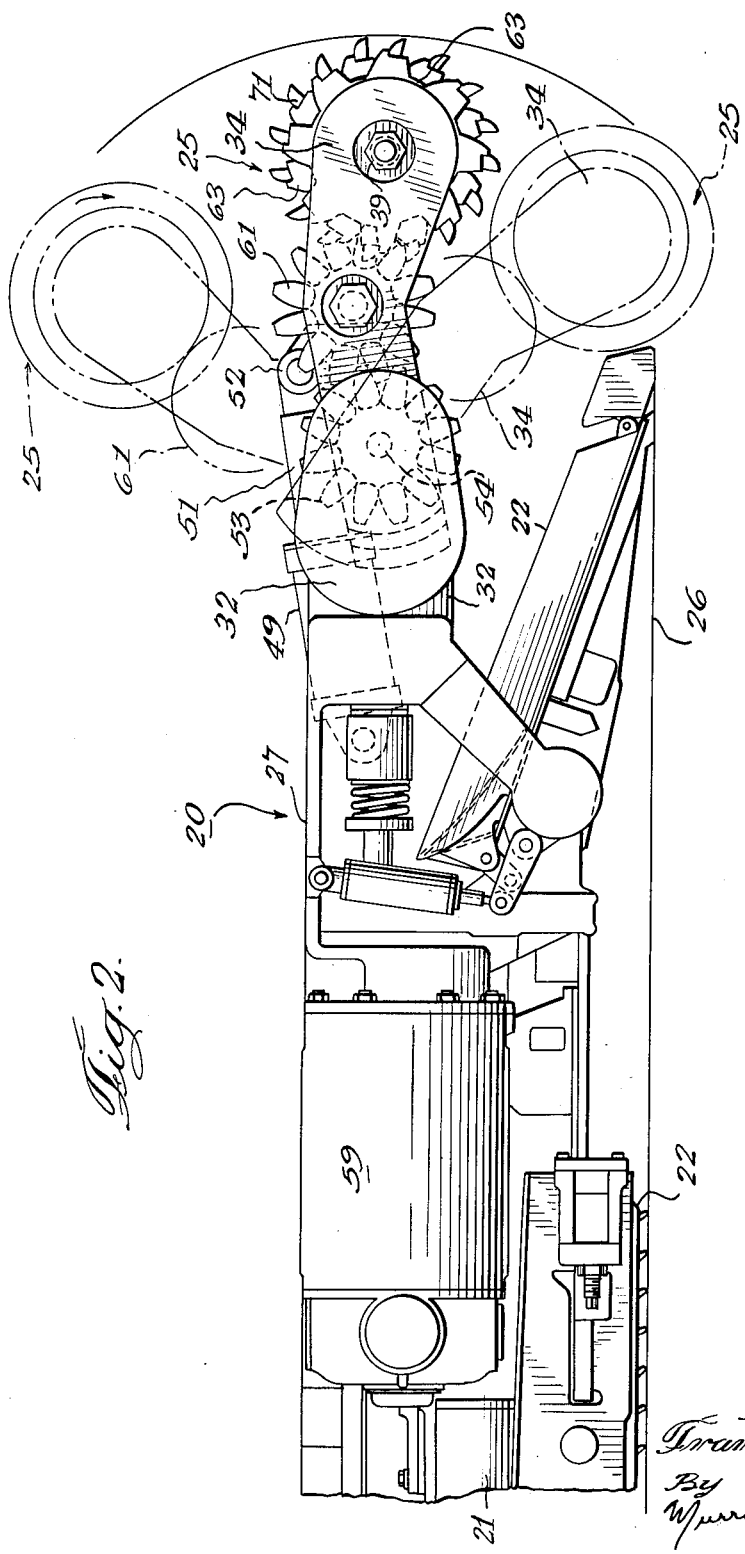

Inventor
Frank Cartlidge
By Murray A. Gleeson
Attorney

United States Patent Office 2,736,545
Patented Feb. 28, 1956

2,736,545

MINING MACHINE ROTATING CUTTER HEAD WITH GEAR TRAIN DRIVE

Frank Cartlidge, Chicago, Ill., assignor to Goodman Manufacturing Company, Chicago, Ill., a corporation of Illinois Application December 11, 1952, Serial No. 325,413

6 Claims. (Cl. 262—20)

This invention relates generally to continuous mining machines and more particularly to an improved cutter head for a continuous miner.

Continuous miners are ordinarily constructed with rotating cutter heads having cutter bits mounted thereon. The cutter head moves up and down with respect to a seam of coal upon a frame which is arranged to swivel in a vertical plane with respect to the main frame of the machine. Driving means for the cutter head have generally been in the form of cutter chains trained around sprockets rotating with the cutter head, the chains carrying cutter bits which cut end kerfs for endwise clearance of the cutter head as it sumps into and moves in a vertical plane with respect to the seam. Gathering means are disposed beneath the frame to gather and convey coal which has been fragmented from the seam and which has fallen to the mine floor.

The driving means for the cutter head has been open to the disadvantage that the sprockets driven by the cutter chains have been known to become packed with coal causing undue tension upon such chains, causing them to break. Furthermore, the presence of sulfur balls or other hard spots in the seam have also been known to cause breakage of the chains.

The path of travel of the cutter chains has also made it unfeasible to locate the gathering mechanism close to the cutter head, and since it must be located well away from the working face of the seam, an inordinate amount of cuttings is piled up in front of the gathering mechanism and beneath the cutter head.

In carrying out the present invention the cutter head is driven through a train of gears constructed so that the driven gear mounted on the cutter head also forms a support for the cutter bits. The train of gears for driving the cutter head is so designed that a reach gear for driving the gear turning with the cutter head is arranged to afford clearance with a cutter bit mounted on each tooth of the final driven gear of the gear train, and in such a fashion that the reach gear also will afford clearance for the mounting means for such cutter bit. The gears forming the gear train have a tooth profile such that the clear distance between adjacent tooth faces is greater than the thickness of the gear tooth. By so doing, clearance is afforded for both a cutter bit mounted at the periphery of the final driven gear of the gear train and for the means mounting such cutter bit.

In order to avoid back lash in such a gear train, and in order to provide good distribution of load between the gears by having more than one point of contact at any instant, all of the gears are arranged in side by side paired relationship, with their teeth staggered half a pitch distance apart.

By providing the driving train and gears in the manner stated the gears are able to operate even though cuttings may fall between the gear teeth, and by forming the tooth contours in the manner stated there will be complete avoidance of any possibility of injuring the gear teeth.

It is therefore a principal object of this invention to provide a cutter head for a continuous mining machine, which cutter head is characterized by a gear train for driving the cutter head, and in which a final driving gear also forms a part of such cutter head and a means of support for cutter bits which turn with the cutter head.

It is also an object of the invention to provide a gear train for the cutting head of a mining machine, which gear train is characterized by tooth contours adapted to provide clearance for cutter teeth mounted in the final driven gear of such gear train.

Another and salient feature of the invention is to provide an improved cutter head for a mining machine, and to enable the gathering mechanism of such mining machine to be disposed in close proximity to the cutter head and beneath same, so that the cuttings will be promptly removed by the gathering mechanism, and so that the mine floor will be substantially free from such cuttings.

Other objects important features of the invention will be apparent from a study of the specification following taken with the drawings which show some preferred embodiments of the invention what are now considered to be the best mode of practicing the principles thereof. Other embodiments of the invention may be suggested to those having the benefit of the teachings herein and it is therefore intended that the invention not be limited by the precise embodiments disclosed herein, the scope of the invention intended to be limited only by the terms of the subjoined claims.

In the drawings:

Fig. 1 is a plan view of a portion of a continuous mining machine having embodied therein the improvements according to the present invention;

Fig. 2 is a side view thereof;

Fig. 3 is a section taken along the line 3—3 of Fig. 1 looking in the direction of the arrows, and showing the driving gears for driving the cutter head shown in Fig. 1;

Fig. 4 is a section taken along the line 4—4 of Fig. 1 looking in the direction of the arrows and showing a pair of reaching gears meshing with the driving gears of Fig. 1 for driving the cutter head shown in Fig. 1;

Fig. 5 is a section taken along the line 5—5 of Fig. 1 looking in the direction of the arrows showing the driven gears meshing with the reaching gears of Fig. 4, and showing the disposition of said gears upon the cutter head, and showing also the manner in which the cutter bits are arranged on such driven gears;

Figure 7:
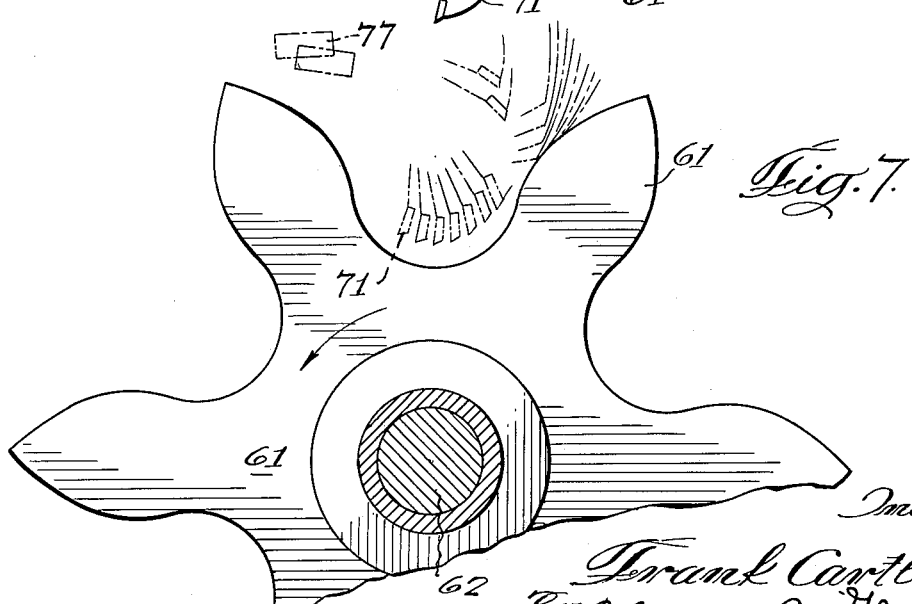

Fig. 7 is a side elevation view of one of the reaching gears shown in Fig. 4 to a somewhat larger scale, and showing the clearance afforded by such reaching gear when in driving engagement with the driven gear, and showing the path of movement of the teeth of such driven gear and the cutter bit mounted thereon when the reaching gear is in mesh with the final driven gear; and Fig. 8 is a side elevation view of a portion of the reaching gear shown in Fig. 5 when meshing with a final driven gear having a modified arrangement for holding a cutter bit mounted in the periphery of the tooth of the final driven gear.

Referring now particularly to Figs. 1 and 2 of the drawings, there is shown a continuous mining machine indicated generally by the reference numeral 20. Such a machine includes a main frame 21 arranged to move on crawler treads 22, and a gathering mechanism indicated generally by the reference numeral 22 which gathers material fragmented from a seam of coal 23 or the like by a cutter head indicated generally by the reference numeral 25. The gathering mechanism 22 gathers coal from a mine floor 26 and moves same upon a flight conveyor 24, which moves the fragmented and gathered material longitudinally of the machine 20 to discharge the material into a mine haulage vehicle, a shaker conveyor or a belt conveyor, not shown. The details of construction of such a mining machine form no part of the present invention and are therefore not described in detail, and other means for gathering and conveying the material fragmented by the cutter head 25 may be provided instead of those shown herein without departing from the present invention.

The machine 20 includes upper forward frame sections 27 each of which has inward extending frame portions 28 which are joined together at flanges 29 by cap bolts 31. Each forward frame section 27 has a forward extending hollow arm 32 which provides points for swiveling movement for a cutter head support arm referred to generally by the reference numeral 33.

As seen particularly in Figs. 1 and 5, the cutter head support arm 33 includes outer arm portions 34 having a trunnion support at 36 on the inner and proximate faces of the hollow arms 32. These outer arm portions 34 are provided at their forward ends, as seen in Fig. 5, with bosses 37 affording a support for a dead shaft 38 supporting the cutter head 25. The dead shaft 38 is maintained in position by nuts 39 threaded to each end of the dead shaft 38 and countersunk within the bosses 37 in such a fashion that the shaft 38 and the nuts 39 do not extend past the extreme faces of the arm portions 34.

The arm portions 34 are joined together so as to swivel about the trunnion supports 36 as a unit by a connecting arm member 41 which is essentially U-shaped, and which comprises a strut 42 extending perpendicularly to the spaced arm portions 34 and arm portions 43 which extend along the arm portions 34 and spaced inward therefrom. The arm portions 43 and 34 are held together at flanges 46 having bolts 47 passing therethrough.

Means are provided to raise and lower the arm portions 34 and the connecting arm member 41 together as a unit while the arm portions 34 support the cutter head 25, and to this end the frame portions 28 are provided with abutments 48 providing points of pivotal connection for lifting cylinders 49. Piston rods 51 of the cylinders 49 are hingedly connected to abutments 52 located on the strut 41. The cylinders 49 are of the double acting type, so that the piston rods 51 thereof may be drawn within the cylinder to lift the support arms 33 together with the cutter head 25 in a substantially vertical plane.

As seen in Figs. 1 to 5 of the drawings the cutter head support arm portions 34, the arm portions 43 and the strut 41 afford a means for supporting driving gear trains consisting generally of a driving gear, a reaching gear and a final driven gear meshing with the reaching gear and affording a support for cutter bits mounted on such final driven gear and made as a part of the cutter head 25. As seen particularly in Figs. 1 and 3, the driving gears of such gear train are indicated generally by the reference numeral 53 and are mounted fast upon a shaft 54 spanning the distance between the spaced arms 34 and 43.

The forward extending arm 32 is hollow as seen in Fig. 3 to enclose a bevel gear 56 made fast to the shaft 54, and meshing with a bevel pinion 57 fast upon a motor shaft 58 driven from a drive motor 59, see Figs. 1 and 2. The driving gears 53 mesh with reaching gears 61 mounted upon idler shafts 62 supported by the arm portions 34 and the strut 41 as seen in Fig. 4. Said reaching gears 61 mesh with final driven gears 63 having their hubs 64 keyed at 65 to a drum 66 of the cutter head 25 as seen in Fig. 5. The drum 66 is supported on the dead shaft 38 by means of bearings 67.

The drum 66 also supports ring segments 68 having bosses 69 extending outward radially therefrom and supporting cutter bits 71. As is customary in such types of cutter heads, part of the cutter bits 71 are inclined to the substantial plane of the ring segment 68, and the bosses 69 are likewise staggered with respect to each other so as to provide what is commonly known as a corn cob type of cutter head.

Heretofore, as is known, such cutter heads have been driven by cutter chains which were open to the difficulties previously referred to. According to the present invention it is possible to have the final driven gear of the driving train including the driving gear 53 and the reaching gear 61 provide a means for supporting cutter bits 71 mounted upon the final driven gear of the said gear train. To this end, and referring now more particularly to Figs. 6 and 7 of the drawings, said gear train is designed in such a fashion that the gear teeth are in contact along a single pressure face only.

The gears of such train are accordingly designed with a relatively large clear pitch distance between the teeth as compared to thickness of each tooth so that the final driven gear can afford a support for a cutter bit which clears the teeth of the reaching gear.

In order to provide good driving efficiency without back lash between the teeth the gears of the train are arranged in side by side relationship, as seen more particularly in Figs. 3 to 5, with the gears staggered one-half a pitch distance with respect to the other. This relative angular displacement of all the gears is maintained throughout the entire train.

Figure 6:
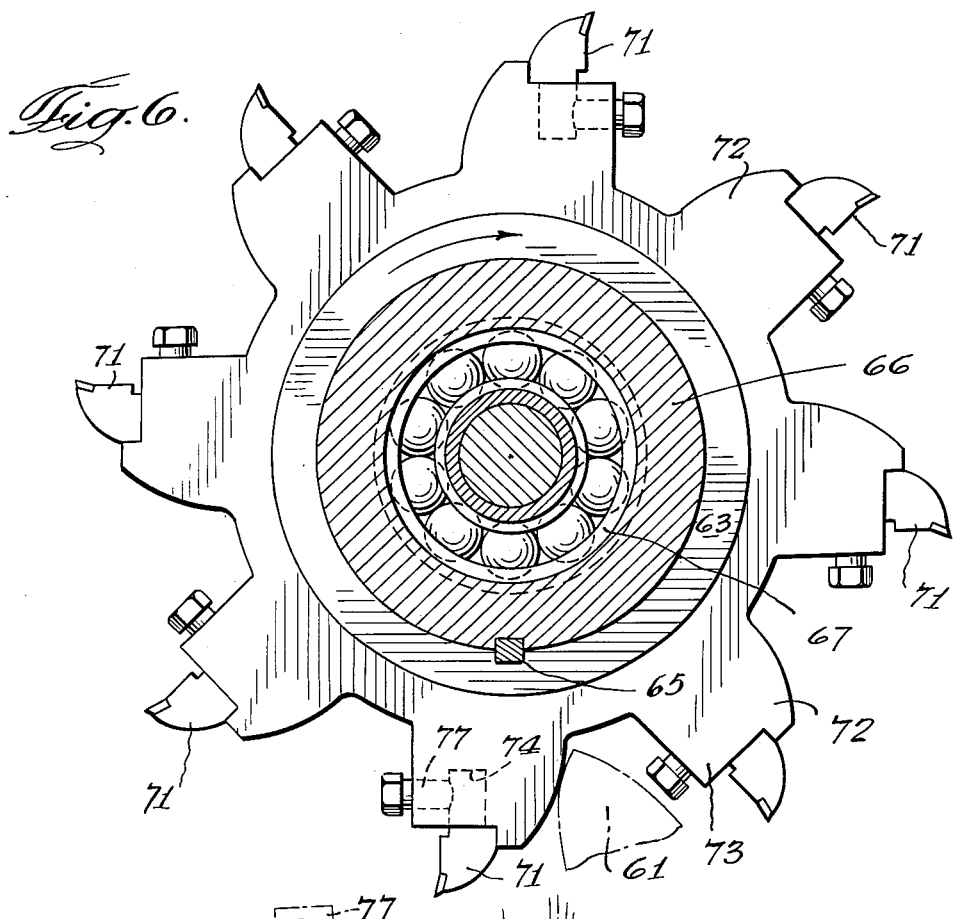
Fig. 6 is an enlarged section taken along the line 6—6 of Fig. 5 looking in the direction of the arrows and showing the cutter bit mounted at the periphery of each tooth of the final driven gear of the cutter head, and showing the means for securing such cutter bit to the gear tooth.

Since in the usual case the cutter head 25 is driven in one direction only, the selection of such a clear pitch distance between adjacent teeth and a tooth profile of the kind as shown in Fig. 7 enables the non-pressure face of each tooth of gear 63 to be provided with a suitable support for a cutter bit 71, which may be staggered in the manner shown in Fig. 5. To this end and as seen in Figs. 6 and 7, each tooth 72 of gear 63 is formed integrally with a bit holder 73 which is drilled at 74 to receive a shank 76 of the bit 71. The bit 71 is held in position at its shank 76 by means of a set screw 77 tapped into the bit holder in a direction at right angles to the drilled bore 74.

Fig. 7 shows the trace of the head of the set screw 77 and the cutter bit 71, and the manner in which both clear the distance between adjacent teeth of the reach gear 61.

By so arranging the driving train in the manner described the final driven gears serve a double function, that of turning the cutter head 25 and also of supporting the cutter bits.

In the arrangement thus far described it is also possible to locate the turning center of the idler gears 61 above the plane containing the centers of the driving gears 53 and the final driven gears 71. In so doing, the arm portions 43 supporting the gear train may be formed as seen in Fig. 2 to afford additional clearance for the gathering mechanism 22. By so doing, the gathering mechanism is disposed relatively well beneath the cutter head 25 in all of its usual positions seen in Fig. 2. Furthermore, when the cutter head 25 completes its pass from the top of the seam to the bottom thereof, the gathering mechanism is close enough to the cutter head 25 as to maintain the amount of fragmented material at the floor 26 at a minimum.

The advantage of such construction as compared to constructions employing driving cutter chains is believed obvious since the usual orbit of travel of such cutter chains makes it impossible to locate the gathering mechanism close to the cutter head.

Referring now to Fig. 8 of the drawings, there is shown a slightly different form of the final driven gear 71 in which the non-pressure faces of teeth 72 of final driven gear 63 are relieved as at 78 to provide clearance for the head 79 of a set screw 81 holding the cutting bit 71 in the tooth 72. Such a form of the invention makes unnecessary the special tooth form shown in Fig. 6.

From the foregoing description it will be evident that the construction according to the present invention presents a number of advantages not found in prior art machines. The provision of the gear train which drives the cutter head insures against jamming of fragments of coal, since the driving gears are not closely meshed. Any coal falling from the seam and onto the idler gears may readily be fragmented by the gear teeth to fall therebetween. The construction described also has the advantage that the train of driving gears, rather than driving cutter chains, enables the gathering mechanism to be disposed closely to the cutter head, since there is no orbital path, as in the case of cutter chains requiring additional space.

While the invention has been described in terms of some preferred embodiments thereof its scope is not intended to be limited by such embodiments, nor otherwise than by the terms of the claims here appended.

I claim:

1. In a continuous miner, a frame including a pair of spaced frame arms supporting a rotating cutter head having cutter bits mounted thereon, means for swiveling said frame together with said cutter head with respect to a seam of coal or the like, a gathering mechanism disposed beneath said frame and said cutter head to remove material which has been fragmented from said seam by said cutter head, said frame arms in side elevation being of inverted V-configuration whereby said cutter head may be disposed in position close to said gathering mechanism when said cutter head is fragmenting material from said seam near the bottom thereof to maintain the amount of fragmented material at said gathering mechanism at a minimum, and a gear train mounted on each of said frame arms for imparting rotative movement to said cutter head, each of said gear trains including a pair of reaching gears, each of which is angularly displaced from the other by approximately one-half a pitch distance, each of said reaching gears meshing with a final driven gear mounted on said cutter head, and means on the non-pressure faces of the teeth of such final driven gear for supporting a cutter bit rotatable therewith, each of said reaching gears having sufficient distance between adjacent teeth so as to enable said cutter bit and its supporting means to clear the teeth of said reaching gear.

2. In a continuous miner, a frame including a pair of spaced frame arms supporting a rotating cutter head having cutter bits mounted thereon, means for swiveling said frame together with said cutter head with respect to a seam of coal or the like, a gathering mechanism disposed beneath said frame and said cutter head to remove material which has been fragmented from said seam by said cutter head, said frame arms in side elevation being of inverted V-configuration whereby said cutter head may be disposed in position close to said gathering mechanism when said cutter head is fragmenting material from said seam near the bottom thereof to maintain the amount of fragmented material at said gathering mechanism at a minimum, and a gear train mounted on each of said frame arms for imparting rotative movement to said cutter head, each of said gear trains including a pair of reaching gears, each of which is angularly displaced from the other by approximately one-half a pitch distance, each of said reaching gears meshing with a final driven gear mounted on said cutter head, and means on the non-pressure faces of the teeth of such final driven gear for supporting a cutter bit rotatable therewith.

3. In a continuous miner, a frame including a pair of spaced frame arms supporting a rotating cutter head having cutter bits mounted thereon, means for swiveling said frame together with said cutter head with respect to a seam of coal or the like, a gathering mechanism disposed beneath said frame and said cutter head to remove material which has been fragmented from said seam by said cutter head, said frame arms in side elevation being of inverted V-configuration whereby said cutter head may be disposed in position close to said gathering mechanism when said cutter head is fragmenting material from said seam near the bottom thereof to maintain the amount of fragmented material at said gathering mechanism at a minimum, and a gear train mounted on each of said frame arms for imparting rotative movement to said cutter head, each of said gear trains including a pair of reaching gears disposed in side by side relationship with the teeth of each arranged approximately one-half a pitch distance from the other, each of said reaching gears meshing with final driven gears mounted on said cutter head, and means on the non-pressure faces of the teeth of such final driven gears for supporting a cutter bit rotatable therewith.

4. In a continuous miner, a frame including a pair of spaced frame arms supporting a rotating cutter head having cutter bits mounted thereon, means for swiveling said frame together with said cutter head with respect to a seam of coal or the like, and a gear train mounted on each of said frame arms for imparting rotative movement to said cutter head, each of said gear trains including a reaching gear which is angularly displaced from the other by approximately one-half a pitch distance, each of said reaching gears meshing with a final driven gear mounted on said cutter head, and means on the non-pressure faces of the teeth of such final driven gear for supporting a cutter bit rotatable therewith, said reaching gear having sufficient distance between adjacent teeth so as to enable said cutter bit and its supporting means to clear the teeth of said reaching gear.

5. A gear train for driving the rotating cutter head of a mining machine of the type where said cutter head is mounted at the end of spaced arms which are pivoted for movement of said cutter head with respect to a seam of coal or the like, said gear train comprising a pair of side by side gears mounted on each of said spaced arms at the pivotal center thereof, said gears being staggered relative to each other by one-half a pitch distance, a pair of side by side reaching gears mounted on each of said arms and meshing with the aforesaid gears, and a pair of gears drivably connected with said cutter head and arranged to turn therewith, all of said gears having tooth contours so arranged that the non-pressure faces of the teeth thereof are spaced by a distance enabling cuttings to fall therebetween, said last named gears being likewise staggered by one-half a pitch distance, each of said last named gears supporting a cutter element at the tip of each tooth thereof, and securing means for each of said cutter elements disposed on the non-pressure faces of the teeth of said last named gears.

6. A gear train for driving the rotating cutter head of a mining machine of the type where said cutter head is mounted at the end of spaced arms which are pivoted for movement of said cutter head with respect to a seam of coal or the like, said gear train comprising a pair of side by side gears mounted on each of said spaced arms at the pivotal center thereof, said gears being staggered relative to each other by one-half a pitch distance, a pair of side by side reaching gears mounted on each of said arms and meshing with the aforesaid gears, and a pair of gears drivably connected with said cutter head and arranged to turn therewith, said last named gears being likewise staggered by one-half a pitch distance, each of said last named gears supporting a cutter element at the tip of each tooth thereof, and securing means for each of said cutter elements disposed on the non-pressure faces of the teeth of said last named gears.

References Cited in the file of this patent

UNITED STATES PATENTS

| Number | Name | Date |
|---|---|---|
| 594,896 | Palmer | Dec. 7, 1897 |
| 1,148,974 | Kuhn et al. | Aug. 3, 1915 |
| 1,148,975 | Kuhn et al. | Aug. 3, 1915 |
| 1,738,251 | Kasley | Dec. 3, 1929 |
| 2,030,063 | Halleck | Feb. 11, 1936 |
| 2,196,231 | Ridgeway | Apr. 9, 1940 |